(12) United States Patent
Jin et al.

(10) Patent No.: US 11,264,826 B2
(45) Date of Patent: Mar. 1, 2022

(54) ENERGY STORAGE MANAGEMENT DEVICE, POWER GENERATION SYSTEM AND POWER DISTRIBUTION METHOD BASED ON BLOCKCHAIN TECHNOLOGY

(71) Applicant: Anjun Jin

(72) Inventors: Anjun Jin, Lafayette, CA (US); Zhihao Li, Ningbo (CN)

(73) Assignee: Anjun Jin, Lafayette, CA (US)

( * ) Notice: Subject to any disclaimer, the term of this patent is extended or adjusted under 35 U.S.C. 154(b) by 0 days.

(21) Appl. No.: 17/107,610

(22) Filed: Nov. 30, 2020

(65) Prior Publication Data
US 2021/0320517 A1    Oct. 14, 2021

(30) Foreign Application Priority Data
Apr. 9, 2020 (CN) .......................... 202010275009.9

(51) Int. Cl.
| | |
|---|---|
| *H02J 7/35* | (2006.01) |
| *H02J 3/38* | (2006.01) |
| *H02S 10/12* | (2014.01) |
| *H02S 40/32* | (2014.01) |
| *H02S 40/38* | (2014.01) |

(52) U.S. Cl.
CPC ................ *H02J 7/35* (2013.01); *H02J 3/381* (2013.01); *H02S 10/12* (2014.12); *H02S 40/32* (2014.12); *H02S 40/38* (2014.12); *H02J 2300/24* (2020.01)

(58) Field of Classification Search
CPC ...... H02J 7/35; H02J 3/38; H02J 3/381; H02J 2300/24; H02S 10/12; H02S 40/32; H02S 40/38
See application file for complete search history.

(56) References Cited

U.S. PATENT DOCUMENTS 10,566,802 B2 *  2/2020  Hunt .................. H02J 7/045

* cited by examiner

*Primary Examiner* — Robert L Deberadinis
(74) *Attorney, Agent, or Firm* — Fang Wu (57) ABSTRACT

The present invention provides an energy storage management device, a power generation system and a power distribution method based on blockchain technology, which comprises an energy storage battery pack, a plurality of battery pack arrays, and an energy storage battery pack connected with a load; AC/DC bidirectional inverter module is connected with power generation device, energy storage battery pack and load respectively; the control module is electrically connected with the energy storage battery pack and AC/DC two-way inverter module respectively. It is used to control the AC/DC two-way inverter module that converts the output electric energy of the generation device and transfer the energy storage battery pack. Furthermore, it is used to control the AC/DC two-way inverter module and the energy storage battery pack to transmit electric energy to the load.

20 Claims, 5 Drawing Sheets

ENERGY STORAGE MANAGEMENT DEVICE, POWER GENERATION SYSTEM AND POWER DISTRIBUTION METHOD BASED ON BLOCKCHAIN TECHNOLOGY

CROSS-REFERENCE TO RELATED APPLICATIONS

This application claims priority to Chinese Patent Application No. 202010275009.9, filed Apr. 9, 2020, commonly assigned and incorporated by reference herein for all purposes.

TECHNICAL FIELD

The invention relates to the field of Ocean thermal energy conversion technology, in particular, to an energy storage management system and a power generation system.

BACKGROUND OF THE INVENTION

The ocean is a green and renewable body for huge energies supply. All countries with the ocean resources in the world promote the development of new energy technologies related to ocean energy and strive to develop ocean energy resources. The ocean thermal energy is one of the important technologies for the development and utilization of ocean energies. The difference in temperature between the surface warm water and the deep cold sea water is used to generate electricity with the help of a special ocean thermal energy conversion.

When the ocean thermal energy conversion equipment generates electricity, the electricity consumption of its load is not equal to that of the generating unit for most of the time. If the electricity generated by the generating device is transmitted directly to the load; and if the generating capacity is greater than the consumption of the load, part of the generating capacity will be wasted. If the generating capacity is less than the load electricity consumption, it will cause the load electricity stress.

Therefore, the technical problem to be solved by the present invention is to overcome the issues of power generation waste or load power stress caused by the mismatch between the power generation and the load in most cases.

BRIEF SUMMARY OF THE INVENTION

The current invention aims to provide Energy storage management device, power generation system and power distribution method based on blockchain technology.

In order to achieve the goal, this invention provides an energy storage management system associated with a power generation apparatus. The energy storage management system includes an energy storage battery pack comprising a plurality of battery arrays, the energy storage battery pack being connected to a load. Additionally, the energy storage management system includes an AC/DC bidirectional inverter module connected respectively with the power generation apparatus, the energy storage battery pack, and the load. Furthermore, the energy storage management system includes a control module electrically connected with the energy storage battery pack and the AC/DC bidirectional inverter module. The control module is configured to control the AC/DC bidirectional inverter module to convert electrical power generated by the power generation apparatus and store the electrical power into the energy storage battery pack, and configured to control both the AC/DC bidirectional inverter module and the energy storage battery pack to transmit electrical power to the load.

Optionally, the energy storage management system further includes a detection module connected with the energy storage battery pack and configured to detect operation parameters of the energy storage battery pack.

Optionally, the control module is configured to receive the operation parameters of the energy storage battery pack to control charging/discharging of the energy storage battery pack.

Optionally, the operation parameters include capacity, voltage, charging current, discharging current, and/or temperature of each battery array in the energy storage battery pack.

Further, the energy storage management system includes a DC/AC inverter module connected respectively with the energy storage battery pack, the control module, and an external power grid. The DC/AC inverter module is configured to convert DC electricity power stored in the energy storage battery pack to AC electricity power and transmit the AC electricity power to the external power grid.

Further, the energy storage management system includes a transformer disposed between the DC/AC inverter module and the external power grid. The transformer is configured to convert the AC electricity power to high-voltage electricity power and transmit the high-voltage electricity power to the external power grid.

Further, the energy storage management system includes a power meter disposed between the DC/AC inverter module and the external power grid. The power meter is configured to measure electricity power transmitted from the energy storage battery pack to the external power grid.

Optionally, the plurality of battery arrays is electrically connected in serial, or in parallel, or in serial parallel.

Optionally, each battery of the plurality of battery arrays is a lithium iron phosphate battery.

In another aspect, the present disclosure provides a power generation system including the energy storage management system described herein in association with an ocean thermal energy conversion apparatus. The ocean thermal energy conversion apparatus includes a solar heater and a turbine. The solar heater is disposed at an input terminal of the turbine and configured to receive solar energy for heat circulation working medium entering the turbine.

Optionally, the ocean thermal energy conversion apparatus further includes a seawater energy storage device configured to store sea water drawn in daytime for heating the circulation working medium.

Further, the power generation system includes a solar power generation device including a plurality of solar panels disposed on the ocean thermal energy conversion apparatus. The plurality of solar panels is connected with the energy storage management system.

Optionally, the plurality of solar panels includes perovskite solar panels.

Further, the power generation system includes a wind power generation device arranged on the ocean thermal energy conversion apparatus. The wind power generation device includes multiple universal wind turbines, each of the multiple universal wind turbines comprises one or more curved blade.

In yet another aspect, the present disclosure provides a method for distributing electricity power from a power generation system described herein as a generator node in a blockchain. The method includes a step of generating a first power-generation data by the ocean thermal energy conversion apparatus. The first power-generation data include a first electricity power and a first energy cost corresponding to the generation of the first electricity power. The method further includes a step of obtaining a second power-generation data from the solar heater. The second power-generation data include a second electricity power and a second energy cost corresponding to the generation of the second electricity power. Additionally, the method includes a step of obtaining a third power-generation data from a wind power generation device associated with the ocean thermal energy conversion apparatus. The third power-generation data include a third electricity power and a third energy cost corresponding to the generation of the third electricity power. Furthermore, the method includes a step of sending the first power-generation data, the second power-generation data, and the third power-generation data through the blockchain to one or more requester nodes in the blockchain based on energy requirements from the corresponding requester nodes.

Optionally, the requester node in the blockchain is a user node with a load consuming electricity power or a power storage station node with a battery storing electricity power.

Further, the method includes a step of determining a generator node in the blockchain that is nearest to the user node based on swarming algorithm based on the first power-generation data, the second power-generation data, and the third power-generation data. The generator node includes at least two power generation apparatuses out of the ocean thermal energy conversion apparatus, the solar heater, and the wind power generation device.

Further, the method includes a step of determining whether to send an energy request from the user node to the generator node in the blockchain that is the nearest to the user node based on the first power-generation data, the second power-generation data, and the third power-generation data.

Further, the method includes a step of supplying electricity power from the at least two power generation apparatuses in the generator node that is the nearest to the user node in the blockchain based on the energy request received from the user node.

Optionally, supplying electricity power includes a step of executing a peer to peer (P2P) protocol to complete a purchase transaction of the electricity power.

The present invention achieves these benefits and others in the context of power generation and blockchain technology. However, a further understanding of the nature and advantages of the present invention may be realized by reference to the latter portions of the specification and attached drawings.

BRIEF DESCRIPTION OF THE DRAWINGS

The description of the drawings constituting part of the application is used to provide further understanding of the invention; the schematic embodiments and the corresponding illustrations are used to explain the invention, and do not constitute the improper limit of the invention. In the drawings.

Drawing references: 1, energy storage battery pack; 3, turbine; 4, condenser; 5, generator; 6, ammonia storage tank; 7, seawater energy storage device; 8, universal wind turbine; 9, solar panel; 10, power meter; 11, solar energy disc; 12, DC/AC inverter module; 13, load; 100, energy storage management system; 15, control module; 17, ocean thermal energy conversion apparatus; 18, AC/DC bidirectional inverter module.

DETAILED DESCRIPTION OF THE INVENTION

The current invention aims to provide energy storage management system, power generation system and power distribution method based on blockchain technology.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The following is a clear and complete description of the technical scheme of the invention in combination with the appended drawings. Obviously, the described embodiments are part of the embodiments of the invention rather than all of them. Based on the embodiments of the present invention, all other embodiments obtained by technicians skilled in the art without making creative labor shall fall within the scope of protection of the present invention.

In description of the present invention, to be sure, the term "center", "up" and "down", "left", "right" and "vertical", "level", "inside" and "outside" indicates a location or position relations based on the location or position shown in the appended drawings, is only to facilitate the description of this invention and simplified description, rather than instructions referred to or implied devices or components must have a specific location, in a specific orientation structure and operation, therefore cannot be interpreted as limiting the invention. In addition, the terms "first", "second", and "third" are used only for descriptive purposes and cannot be understood to indicate or imply relative importance.

Implementation Example 1

Figure 1:
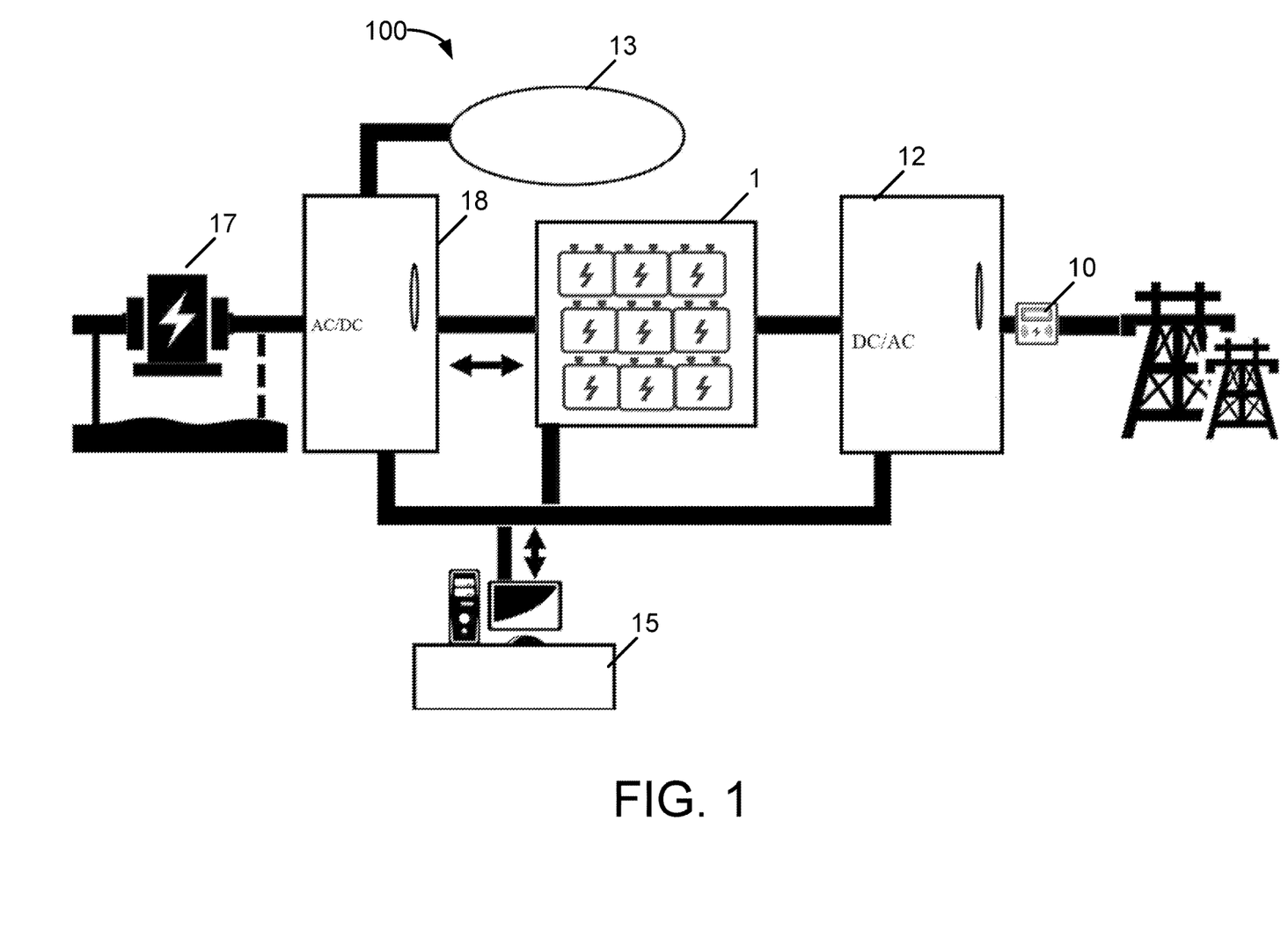
FIG. 1 is a schematic diagram of the principle of an energy storage management system according to an embodiment of the present invention.

The first aspect of the embodiment of the invention provides an energy storage management system 100, which is referred to FIG. 1, including an energy storage battery pack 1, AC/DC bidirectional inverter module 18 and a control module 15. The energy storage battery pack 1 comprises a plurality of battery arrays, and the energy storage battery pack 1 is connected to a load 13. The AC/DC bidirectional inverter module 18 is connected with a power generation apparatus 17, energy storage battery pack 1 and load 13 respectively. The control module 15 is connected with the energy storage battery pack 1 and AC/DC bidirectional inverter module 18 and is used to control the AC/DC bidirectional inverter module 18 to convert the output electric energy of the generation apparatus 17 and store it in the energy storage battery pack 1. It is also used to control the AC/DC bidirectional inverter module 18 and the energy storage battery pack 1 to transmit electric energy to the load 13. Optionally, the power generation apparatus 17 is an ocean thermal energy conversion apparatus.

Among them, AC/DC bidirectional inverter module 18 can be used for voltage regulation, voltage regulation, and constant current of the electric energy output in the power generation system 17 to convert it into high-voltage constant current DC electric energy. The energy storage battery pack 1 can be charged through a high-voltage charging and discharging unit in the AC/DC bidirectional inverter module 18. When the energy storage battery pack 1 reaches the set upper limit, the charging will stop. In addition, the AC/DC bidirectional inverter module 18 can also be used to provide the converted AC or DC power to the load 13 through the output port while charging the energy storage battery pack 1 and if the load 13 needs to provide power.

Optionally, the AC/DC bidirectional inverter module 18 can adjust the output voltage to 220V/380V according to the requirements of load 13, or output other voltage values according to the load requirements.

Optionally, the control module 15 also includes a display unit to take advantage of the user's monitoring and intervention of the energy storage manager's health.

The energy storage battery pack 1 is used to store the electric energy output of the power generation apparatus 17, which can provide the electric energy output to the load 13, and can also provide the electric energy output to the power grid. The control module 15 controls the AC/DC bidirectional inverter module 18 to charge the energy storage battery pack 1 or control the energy storage battery pack 1 to discharge the load 13 to the power grid according to the generation capacity of the power generation apparatus 17, the amount of electricity of the load 13 and the amount of electricity stored in the energy storage battery pack 1.

To be specific, the energy storage battery pack 1 can consist of 160 lithium iron phosphate batteries with a specified capacity of 100 Ah and 3.2V. The voltage of the energy storage battery pack 1 is 512V, and its charging voltage should be higher than 512V. In addition, in order to improve the charging efficiency of the energy storage battery pack 1, the charging voltage is higher than 512V, and the value of floating voltage should also be added.

The energy storage management system 100 of FIG. 1 also includes a detection module (not explicitly shown), which is electrically connected with the energy storage battery pack 1 to detect the operating parameters of battery array in the energy storage battery pack 1 and transfer the operating parameters to the control module 15; The control module 15 controls the charging and discharging of the battery array according to the operating parameters of the battery array.

Detection module is configured mainly to detect the battery array operation parameters, including the capacity of energy storage battery pack 1, charging voltage, charging current, discharge current, temperature, and others. The control module 15 is configured to manage the energy storage battery pack 1, based on the detected operation parameters, to ensure that charging and discharging of the energy storage battery pack 1 not over voltage and current settings and not overheat. The control module 15 also is to ensure realization of other functions such as short-circuit protection and balanced charging. The detection module, when detecting anomalies in energy storage battery pack 1, will sent detection signal to the control module 15 to generate control instruction for adjusting operation mode of the energy storage battery pack 1. The energy storage battery pack 1 will be adjusted according to rules of balanced charging to balance charging voltage and charging current in battery array. When the voltage of battery arrays reaches a charging voltage upper limit, control module 15 will send instruction to stop charging and ensure safe operation of the energy storage battery pack 1 and battery array therein. When the battery array of the energy storage battery pack 1 is discharging, the voltage and current parameters of each battery array are also detected. When the voltage of the battery array drops to the lower limit of the voltage, the battery array is controlled to stop discharging. In addition, when a short circuit or temperature value exceeding the upper limit in the battery array of the energy storage battery pack 1 is detected, the circuit of the battery array will be disconnected.

Referring to FIG. 1, the energy storage management system 100 also includes a DC/AC inverter module 12. The DC/AC inverter module 12 is connected with energy storage battery pack 1, control module 15, and external power grid respectively. Under the control of the control module 15, the DC/AC inverter module 12 converts the DC electric energy stored in the energy storage battery pack 1 into AC electric energy and transmits it to the external power grid.

Optionally, the DC/AC inverter module 12 and AC/DC bi-directional inverter module 18 are equipped with various switches and safety devices to connect with the load 13 according to the wiring rules.

In an embodiment, the energy storage management system 100 also includes a transformer (not explicitly shown). The transformer is set between the DC/AC inverter module 12 and the external power grid, which is used to convert the AC electric energy output by the DC/AC inverter module 12 into high-voltage electric energy, and transmit the high-voltage electric energy to the external power grid.

In an embodiment, the DC/AC inverter module 12 is used to convert the DC electric energy stored in the energy storage battery pack 1 into AC electric energy, which is converted into high-voltage electric energy by the transformer and then transmitted to the external power grid. The DC/AC inverter module 12 according to the external grid transmission voltage and current requirements for conversion, to ensure safe and stable transmission of voltage to the external grid, to ensure that the external grid is not impacted.

The energy storage management system 100 also includes a power meter 10. The power meter 10 is set between the DC/AC inverter module 12 and the external power grid to measure the amount of electricity transmitted from the energy storage battery pack 1 to the external power grid.

Figure 2:
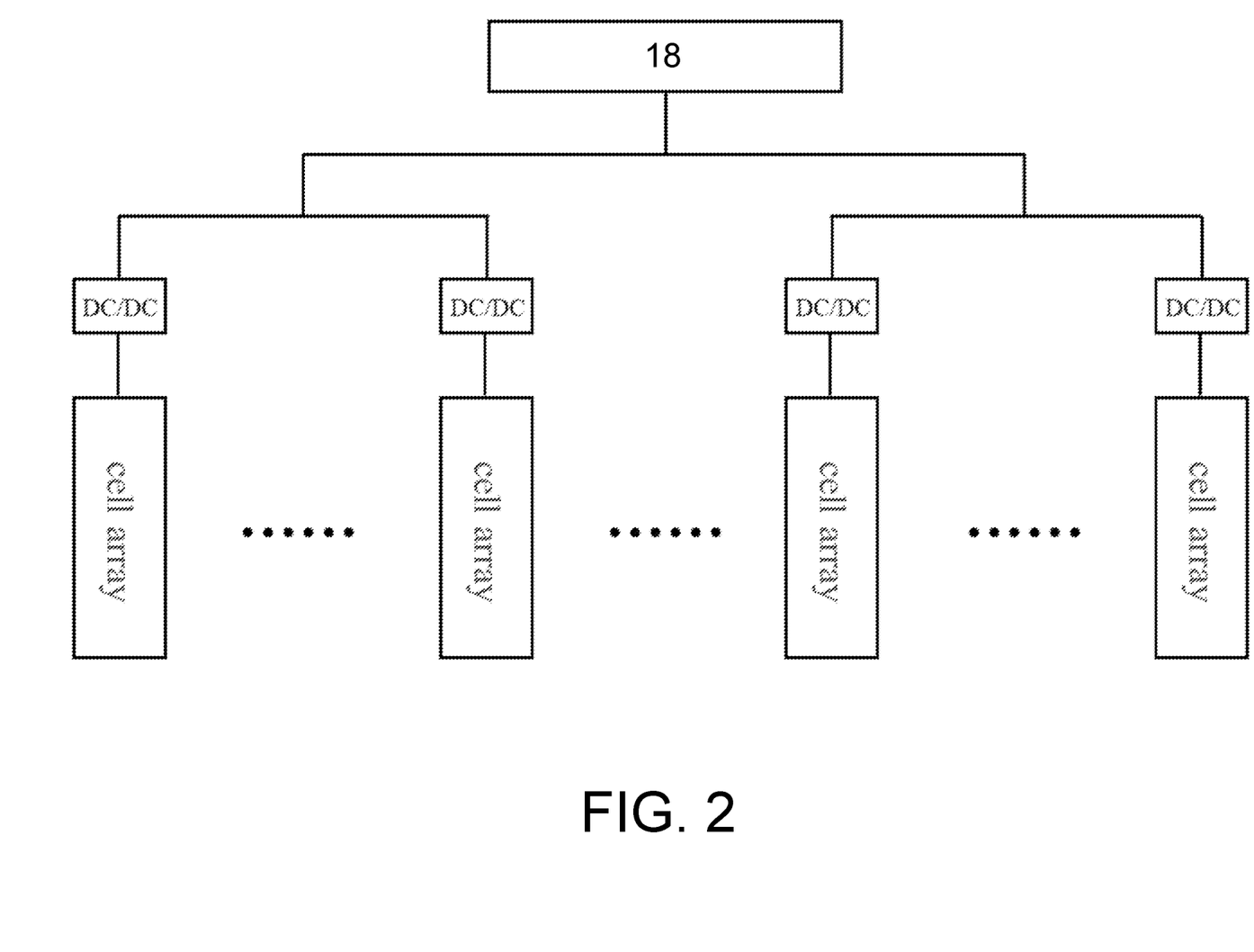
FIG. 2 is a schematic diagram of battery array connection of the energy storage battery pack of FIG. 1 according to an embodiment of the present invention.

In an embodiment, multiple battery arrays are electrically connected in serial, parallel, or serial parallel. No matter what connection mode is adopted for the battery arrays, the detection module conducts real-time detection on each battery array to ensure the safe operation of each battery array of the energy storage battery pack 1. In an embodiment, referring to FIG. 2, each battery array is connected to an AC/DC bidirectional inverter module 18 through a DC/DC unit.

Optionally, the battery array is a lithium iron phosphate battery. Lithium iron phosphate battery is characterized with high working voltage, large energy density, long cycle life, good safety performance, self-discharge rate of small, and no memory effect, and many other advantages, and is suitable for large-scale electricity power storage. Lithium iron phosphate battery has been widely applied in fields like renewable energy power station safety grid, power grid peak shaving, distributed power stations, UPS power supply, emergency power supply system. The energy storage management system based on the Lithium iron phosphate battery of the present invention is enabled with very good power storage features.

Optionally, the battery array can also be lithium free battery, lithium cobalt acid battery, lithium manganese acid battery, lithium titanate battery, etc. The battery type used in the battery array is only to describe the specific implementation mode of the embodiment of the present invention, but the invention is not limited by this.

When the power generation apparatus is working normally, the energy storage battery pack 1 receives the electric energy of the power generation apparatus for storage. When the electric energy stored in the energy storage battery pack 1 reaches the set value, it is connected with the external power grid and transmits the electric energy to the external power grid. At the same time, when the connected load 13 needs power supply and the power output of the power generation apparatus is insufficient to meet the demand of the load 13, the control module 15 controls the energy storage battery pack 1 to supply power to the load 13 to meet the user's demand. By controlling charging and discharging of the energy storage battery pack 1, the control module 15 and the detection module in the energy storage management system 100 can control the detection and charging/discharging management of the external power grid and the load 13, and improve matching characteristics of the power generation apparatus 17 and the external power grid and the load 13.

Implementation Example 2

Figure 3:
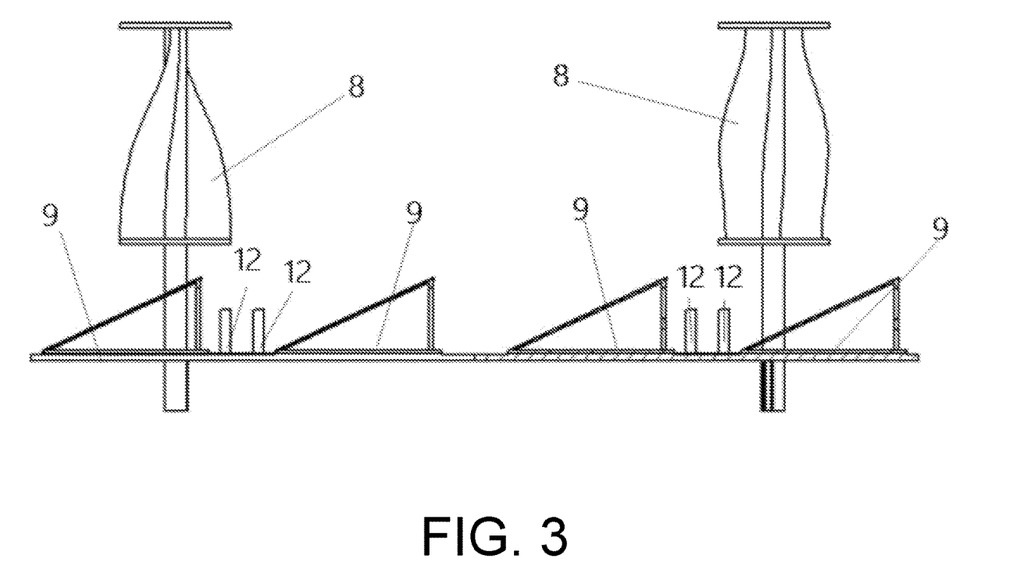
FIG. 3 is a schematic diagram of a universal wind power generator structure according to an embodiment of the present invention.

In another aspect, the present disclosure also provides a power generation system including the energy storage management system described herein. FIG. 3 is a schematic diagram of a universal wind power generation structure according to an embodiment of the present invention. As shown, the power generation system is configured as a wind power generation system including a plurality of universal wind turbines 8, which are provided with one or more curved blades. Optionally, the wind power generation system also includes multiple solar power generation units each installed with a solar power generation device. The solar power generation device includes a plurality of parallel connected solar panels 9. Optionally, the wind power generation system is arranged on an ocean thermal energy conversion apparatus. Multiple solar panels 9 are connected via DC/AC bidirectional inverter modules 12 with an energy storage management system.

Figure 4:
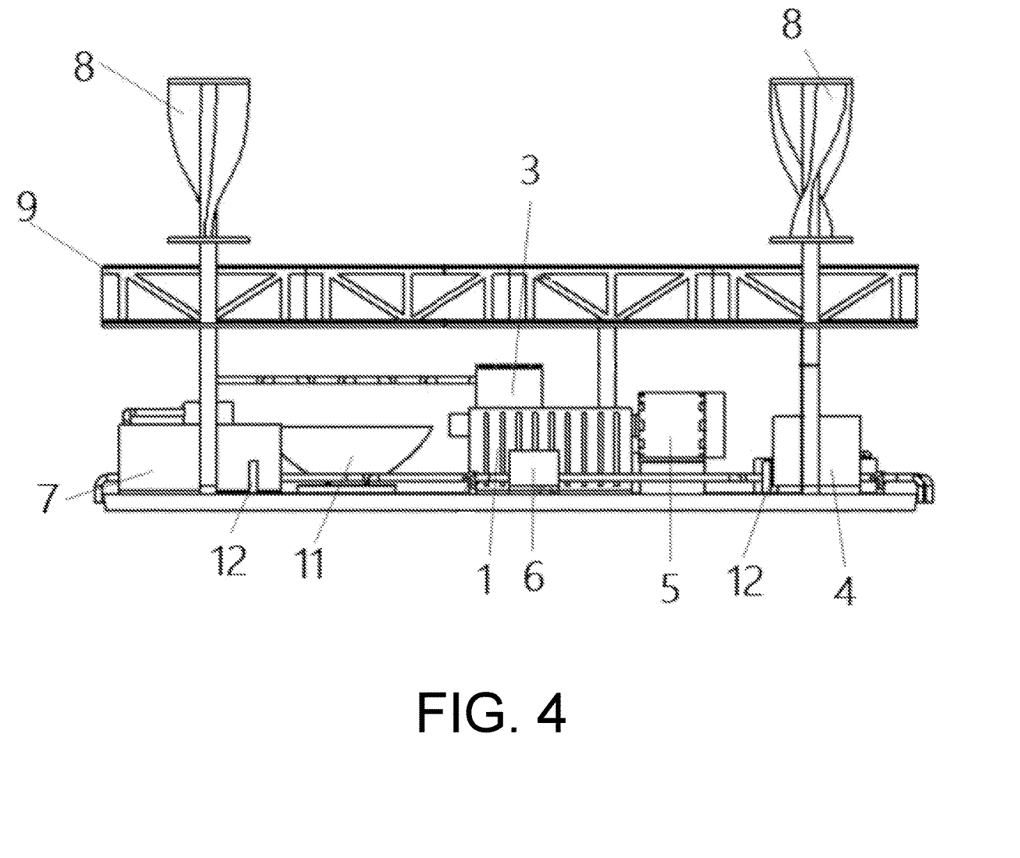
FIG. 4 is a schematic diagram of a power generation system according to another embodiment of the present invention.
Figure 5:
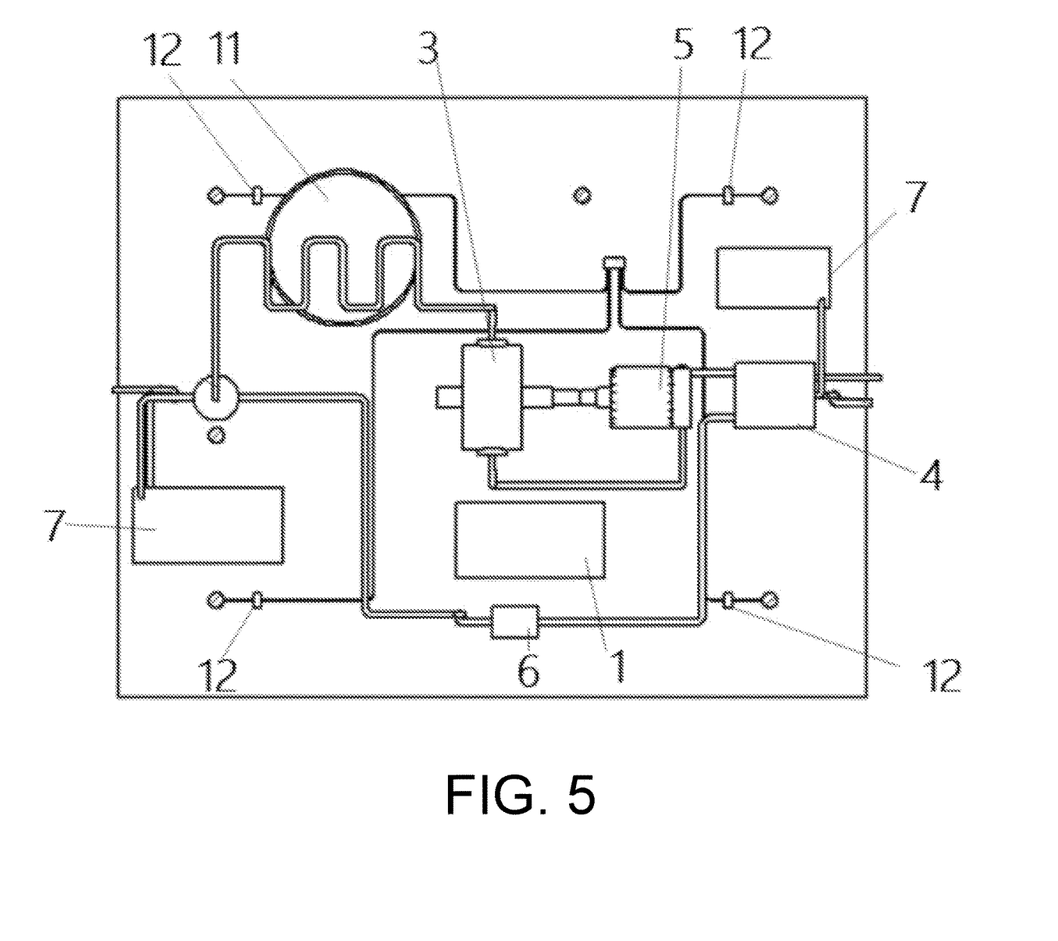
FIG. 5 is a schematic diagram of a power generation system according to yet another embodiment of the present invention.

In the implementation example, the energy storage management system 100 described in FIG. 1 is in association with an ocean thermal energy conversion apparatus. FIG. 4 is a schematic diagram of a power generation system according to an embodiment of the present invention. As shown, this power generation system is an ocean thermal energy conversion apparatus based on offshore energy conversion as well as electricity generation from wind power and solar power. A thermodynamically meta-stable layer beneath the surface water layer provides the warm water-supply. Ocean energy source is huge green renewable energy. The energy is utilized by using approximately 20 deg C. temperature difference between water at ocean surface and cold water at a distance of 600 meters to 1000 meters depth below the ocean surface. By setting the ocean temperature difference, the power generation system set within the circulation medium through the evaporator and condenser circulating process can drive the turbine impeller rotation to produce mechanical energy which is then converted to electricity. Optionally, the ocean thermal energy conversion apparatus in the embodiment adopts a closed cycle mode that is a working mode with ammonia as working medium. FIG. 5 also shows a top view of some components in the power generation system of FIG. 4.

Referring to FIG. 4 and FIG. 5, the power generation system based on ocean temperature difference includes a condenser 4, evaporator, turbine 3, generator 5, water pump, circulation working medium pump that connects the pipes. The function of the condenser 4 is to transfer the low temperature to the condenser 4 by using the low temperature seawater from the bottom of the ocean. For example, ammonia gas cools down and condenses into liquid after passing through the condenser 4, and then the liquid is transferred to the evaporator for the next cycle through the circulation working medium pump. The evaporator outputs the heat of the warm sea water with relatively high surface temperature to liquid ammonia, which makes the liquid ammonia absorb heat and evaporate into gaseous state. The circulation working medium is converted from liquid ammonia to gaseous ammonia, and the volume expands rapidly, which drives impellers of the turbine 3 to rotate to drive the generator 5 to generate electricity.

Alternatively, the circulation working medium in the power generation system of FIG. 4 (and FIG. 5) is ammonia gas, which is stored in the ammonia storage tank 6 and thickens the liquid ammonia into the pipeline through the working medium pump. The liquid ammonia pipeline passes through a flash evaporator filled with warm seawater. The warm seawater heats the liquid ammonia in the pipeline for the first time to vaporize the liquid ammonia, and the ammonia gas after gasification enters the solar heater through the pipeline. Optionally, solar heater utilizes the sun's energy to heat the gasified ammonia a second time. The heated ammonia gas has a higher temperature, which further improves the ocean thermal energy conversion efficiency. The temperature of ammonia gas entering the turbine 3 reaches the highest, which drives the turbine 3 blade to rotate and drives the generator 5 to generate electricity. After passing through the turbine 3, the ammonia gas enters the condenser 4.

In an embodiment, the power generation system is configured to have a combined output of wind power and solar power to be as much as half of the system's total.

Optionally, in order to improve the utilization rate and avoid idling and waste of the energy storage management system, the energy storage capacity of the energy storage management system shall be the total generating capacity of the power generation system in one day.

Referring to FIG. 4 and FIG. 5, the power generation system based on ocean thermal energy conversion apparatus includes a solar heater and turbines 3. The solar heater is installed at the input end of the turbine 3 to obtain solar energy and heat the circulation working medium entering the turbine 3.

Optionally, the solar heater is configured to be a solar energy disc 11 at the input terminal of the turbine 3. In order to improve the temperature of circulation working medium entering the turbine 3, the solar energy disc 11 heats the circulation working medium entering the turbine 3, so as to improve the thermal cycle efficiency of the ocean thermal energy conversion apparatus.

In an embodiment of the present invention, the ocean thermal energy conversion apparatus also includes a seawater energy storage device 7. Seawater energy storage device 7 is used to store seawater extracted during the day and heated to circulation working medium. Ocean sea surface temperature is higher in the daytime. After the sea water enters a flash vessel of the ocean thermal energy conversion apparatus to heat the circulation working medium, its temperature is still high. It can be stored in seawater energy storage device 7 and used for heating the circulation working medium again in the evening when ocean surface temperature is lower. Thus, the power generation capacity of the thermal energy conversion apparatus can be improved at nighttime and consistency of power generation in the day and night is also improved.

In this implementation example, the condenser 4 is also equipped with seawater desalination device. Cold water through cooling water pump enters a cold pool. Turbine 3 outputs ammonia through pipes into a cold water pool to be cooled as ammonia liquid. Cold water absorbs heat to vaporize. A condensation plate is set at the top of the cold water pool to condense the water vapor to obtain fresh water. At the same time, liquid ammonia is obtained, too. The seawater desalination device adds seawater desalination function to the power generation system on top of the energy storage function, which improves energy utilization efficiency and meets users' demand for fresh water.

Optionally, the power generation system of FIG. 4 also includes a solar power generation device. The solar power generation device includes a plurality of parallelly connected solar panels 9 arranged on an ocean thermal energy conversion apparatus. Multiple solar panels 9 are connected to the energy storage management system thereof. Optionally, multiple solar panels 9 are connected in serial, parallel or serial parallel. Optionally, multiple solar panels 9 will be installed around and on the roof of an offshore platform where the ocean thermal energy conversion apparatus is located to maximize the number of solar panels 9 that can convert solar energy into electricity and improve energy efficiency.

Preferably, the solar panels are perovskite solar panels. Perovskite solar panel is a solar cell using perovskite type organic metal halide semiconductor as light absorbing material. At present, the photoelectric conversion efficiency of perovskite solar PV panels has been about 23% and higher, with many advantages of high photoelectric conversion efficiency, wide field of application, long life, etc.

Additionally, the power generation system of FIG. 4 includes a wind power generation device such as one shown in FIG. 3 on an ocean thermal energy conversion apparatus. The wind power generation device includes a plurality of universal wind turbines 8, which are provided with one or more curved blades. Multi-directional wind turbines 8 located on offshore platforms of the ocean thermal energy conversion apparatus can turn wind energy into electricity when driven by wind from any direction, resulting in significantly improved power generation efficiency. Optionally, the wind power installation consists of four universal wind turbines, each located at the edge of the offshore platform.

The embodiment of the present invention provides a power generation system in association with an energy storage management system which is configured to store the electricity power generated by a power generation apparatus through an energy storage battery pack configured to output electric energy when the load power consumption is high to make up for the insufficient power generation of the power generation apparatus. Additionally, the energy storage management system in the power generation system is configured to store electric energy when the load power consumption is low to avoid the problem of waste of excess power generated by the power generation apparatus. The power generation system of the embodiment combines a variety of clean energy sources including ocean thermal energy conversion, wind power, and solar energy and improves energy utilization efficiency.

Implementation Example 3

In an alternative aspect, the present disclosure provides a power distribution method based on blockchain associated with the power generation system including the energy storage management system described herein. The power generation system includes at least two of three following power generation apparatuses, an ocean thermal energy conversion apparatus, a solar heater, and a wind power generator. All the power generation apparatuses in the system are connected to an energy storage management system. In the embodiment, the power generation system is distributed as a generator node within a blockchain. The blockchain can include multiple generator nodes in different locations and a plurality of requester nodes at different distances from corresponding generator nodes. The method includes following steps for distributing power through the blockchain. A first step includes generating a first power-generation data by the ocean thermal energy conversion apparatus. The first power-generation data includes a first electricity power and a first energy cost corresponding to the generation of the first electricity power.

The method includes a step of obtaining a second power-generation data generated by the solar heater, the second power-generation data includes a second electrical power and a second energy cost corresponding to the generation of the second electrical power.

The method also includes a step of obtaining a third power-generation data generated by the wind power generator, the third power-generation data includes a third electrical power and a third energy cost corresponding to the generation of the third electrical power.

Optionally, the first electrical power, the second electrical power, and the third electrical power respectively generated from the ocean thermal energy conversion apparatus, sola heater, and wind power generator represent electricity with power unit in kWh. At the same time, the first, second, and third energy costs represent the price per kilowatt hour of electricity that can be provided. For example, the first energy cost is 10 cents per kilowatt hour.

In this embodiment, the power generation system including the ocean thermal energy conversion apparatus, the solar heater, and the wind power generator all connected with the energy storage management system of FIG. 1, through which the electric energy generated by the three generation apparatuses is stored. Furthermore, the first, second, and third electric powers may also include battery power capacity, historical transaction status, etc., which should not be narrowly defined in this embodiment.

The method further includes a step of sending the first power-generation data, the second power-generation data, and the third power-generation data through the blockchain to one or more requester nodes in the blockchain according to respective requirements on energy usages at the corresponding requester nodes. Optionally, the requester nodes in the blockchain include user node, shopping mall node, power storage station node, and more. Optionally, a user node refers a regional customer of energy, such as a city, a district, a company, etc. having a load consuming electricity power. Optionally, a power storage station node may be equipped with capacitors and batteries and other devices such as inverters, which can be used for charging the storage station for storing electricity power.

Additionally, the method includes a step of determining a generator node to be nearest to a user node based on Swarming algorithm after sending the first power-generation data, the second power-generation data, and the third power-generation data to a requester node which is a user node. The generator node contains at least two power generation apparatuses of the ocean thermal energy conversion apparatus, the solar heater, and the wind power generator in the power generation system. Through calculations under Swarming algorithm, distances of the user node from the ocean thermal energy conversion apparatus, the solar heater, and the wind power generator can be obtained. For example, it reveals that the ocean thermal energy conversion apparatus is nearest to the user node so that the energy storage management system can control supply of electricity power from the ocean thermal energy conversion apparatus to the user node to avoid excess power loss in the process of power transmission.

Furthermore, the method includes a step of determining whether to send a power-generation request to the generator node that is nearest to the user node based on corresponding power-generation data selected from the first, second, and third power-generation data. In particular, this step includes determining whether the power generation apparatus of the power generation system in the corresponding generator node is able to meet the needs of the user node based on the power-generation data from the corresponding generator node. For example, a user node is an energy storage node. It needs to fill capacity of 1000 kWh. If through the Swarming algorithm the nearest generator node to the user node is found to be a solar heater which can provide about 800 kWh at the best, then the system will decide to ignore the solar heater at this time, instead, to choose a little farther generator node with a power generation apparatus, such as the ocean thermal energy conversion apparatus, capable of providing sufficient power to meet the user's energy request.

Moreover, the method includes a step of sending the power-generation request from the user node to the nearest generator node after it is chosen based on corresponding power-generation data that can meet the energy needs of the user node. The method includes a step of supplying power from the nearest generator node to the user node based on the energy request received from the user node. For example, the ocean thermal energy conversion apparatus at a generator node receives an energy request from a user node, which may be a shopping mall node, that has a load having specific energy needs. The energy request includes a request on purchasing electricity power with a price of 10 cents per 1 kWh. The ocean thermal energy conversion apparatus can be used to generate the electricity power in accordance with the energy request.

In the embodiment, the blockchain technology is characterized by transparency and efficiency, so that the power supply operation based on the blockchain can provide efficient and stable power supply operation for customers. Then, the electricity power can be directly transmitted to the user or the power grid in association with executing a peer to peer (P2P) protocol to complete the transaction of electricity power purchased by the user.

In the embodiment, the method also includes setting up a power management unit to serve as a digital interface for the whole system for power generation, usage, storage, distribution, and transaction, to make it very user friendly.

The above is only the preferred embodiment of the invention, and should not be used to limit the invention; for the technical personnel in the field, the invention can have various changes and variations. In the spirit and principle of the invention, any modification, equivalent replacement or improvement, etc., shall be included in the protection scope of the invention.

What is claimed is:

1. An energy storage management system associated with a power generation apparatus, comprising:
   an energy storage battery pack comprising a plurality of battery arrays, the energy storage battery pack being connected to a load;
   an AC/DC bidirectional inverter module connected respectively with the power generation apparatus, the energy storage battery pack, and the load; and
   a control module electrically connected with the energy storage battery pack and the AC/DC bidirectional inverter module, and configured to control the AC/DC bidirectional inverter module to convert electrical power generated by the power generation apparatus and store the electrical power into the energy storage battery pack, and configured to control both the AC/DC bidirectional inverter module and the energy storage battery pack to transmit electrical power to the load.

2. The energy storage management system of claim 1, further comprising a detection module connected with the energy storage battery pack, and configured to detect operation parameters of the energy storage battery pack.

3. The energy storage management system of claim 2, wherein the control module is configured to receive the operation parameters of the energy storage battery pack to control charging/discharging of the energy storage battery pack.

4. The energy storage management system of claim 2, wherein the operation parameters comprise capacity, voltage, charging current, discharging current, and/or temperature of each battery array in the energy storage battery pack.

5. The energy storage management system of claim 1, further comprising a DC/AC inverter module connected respectively with the energy storage battery pack, the control module, and an external power grid, and configured to convert DC electricity power stored in the energy storage battery pack to AC electricity power and transmit the AC electricity power to the external power grid.

6. The energy storage management system of claim 5, further comprising a transformer disposed between the DC/AC inverter module and the external power grid, and configured to convert the AC electricity power to high-voltage electricity power and transmit the high-voltage electricity power to the external power grid.

7. The energy storage management system of claim 5, further comprising a power meter disposed between the DC/AC inverter module and the external power grid, and configured to measure electricity power transmitted from the energy storage battery pack to the external power grid.

8. The energy storage management system of claim 1, wherein the plurality of battery arrays is electrically connected in serial, or in parallel, or in serial parallel.

9. The energy storage management system of claim 8, wherein each battery of the plurality of battery arrays is a lithium iron phosphate battery.

10. A power generation system including the energy storage management system of claim 1 in association with an ocean thermal energy conversion apparatus, wherein the ocean thermal energy conversion apparatus comprises a solar heater and a turbine; wherein the solar heater is disposed at an input terminal of the turbine and configured to receive solar energy for heating circulation working medium entering the turbine.

11. The power generation system of claim 10, wherein the ocean thermal energy conversion apparatus further comprises a seawater energy storage device configured to store sea water drawn in daytime for heating the circulation working medium.

12. The power generation system of claim 10, further comprising a solar power generation device including a plurality of solar panels disposed on the ocean thermal energy conversion apparatus, wherein the plurality of solar panels is connected with the energy storage management system.

13. The power generation system of claim 12, wherein the plurality of solar panels comprises perovskite solar panels.

14. The power generation system of claim 10, further comprising a wind power generation device arranged on the ocean thermal energy conversion apparatus, wherein the wind power generation device comprises multiple universal wind turbines, each of the multiple universal wind turbines comprises one or more curved blades.

15. A method for distributing electricity power from a power generation system of claim 10 as a generator node in a blockchain, comprising:
generating a first power-generation data by the ocean thermal energy conversion apparatus, the first power-generation data including a first electricity power and a first energy cost corresponding to the generation of the first electricity power;
obtaining a second power-generation data from the solar heater, the second power-generation data including a second electricity power and a second energy cost corresponding to the generation of the second electricity power;
obtaining a third power-generation data from a wind power generation device associated with the ocean thermal energy conversion apparatus, the third power-generation data including a third electricity power and a third energy cost corresponding to the generation of the third electricity power; and
sending the first power-generation data, the second power-generation data, and the third power-generation data through the blockchain to one or more requester nodes in the blockchain based on energy requirements from the corresponding requester nodes.

16. The method of claim 15, wherein the requester node in the blockchain is a user node with a load consuming electricity power or a power storage station node with a battery storing electricity power.

17. The method of claim 16, further comprising determining a generator node in the blockchain that is nearest to the user node based on swarming algorithm based on the first power-generation data, the second power-generation data, and the third power-generation data, the generator node comprising at least two power generation apparatuses out of the ocean thermal energy conversion apparatus, the solar heater, and the wind power generation device.

18. The method of claim 17, further comprising determining whether to send an energy request from the user node to the generator node in the blockchain that is the nearest to the user node based on the first power-generation data, the second power-generation data, and the third power-generation data.

19. The method of claim 18, further comprising supplying electricity power from the at least two power generation apparatuses in the generator node that is the nearest to the user node in the blockchain based on the energy request received from the user node.

20. The method of claim 19, wherein supplying electricity power comprises executing a peer to peer (P2P) protocol to complete a purchase transaction of the electricity power.

\* \* \* \* \*